United States Patent [19]

Tundo et al.

[11] 4,195,866
[45] Apr. 1, 1980

[54] LOCK FOR REMOVABLE ROOF CLOSURE LATCH MECHANISM

[75] Inventors: Frank Tundo, Warren; Edward A. Schneidewind, Detroit, both of Mich.

[73] Assignee: General Motors Corporation, Detroit, Mich.

[21] Appl. No.: 961,138

[22] Filed: Nov. 16, 1978

[51] Int. Cl.² ............................................. E05C 9/04
[52] U.S. Cl. ...................................... 292/127; 292/6; 292/336.3
[58] Field of Search ....................... 292/6, 7, 39, 336.3, 292/64, 210, DIG. 5, 127; 49/36, 483, 495; 296/137 B, 148

[56] References Cited

U.S. PATENT DOCUMENTS

| | | | |
|---|---|---|---|
| 509,941 | 12/1893 | Perry | 292/7 |
| 1,090,470 | 3/1914 | Gervais et al. | 292/7 |
| 2,556,062 | 6/1951 | Buehrig | 296/137 B |
| 2,787,154 | 4/1957 | Wesberry | 292/39 X |
| 3,266,838 | 8/1966 | Heincelman | 292/DIG. 5 |
| 3,858,921 | 1/1975 | Kuki | 292/336.3 |

FOREIGN PATENT DOCUMENTS 11674 of 1908 United Kingdom ...................... 292/39

*Primary Examiner*—Richard E. Moore
*Attorney, Agent, or Firm*—Charles E. Leahy

[57] ABSTRACT

A latch mechanism for securing a removable closure panel in a vehicle body roof opening includes first and second keepers mounted on the vehicle body at the opposite sides of the roof opening. First and second operating levers are pivotally mounted on the closure panel for movement about spaced axes and are respectively pivotally connected with first and second latch bolts having interengaging gear teeth which rotate the operating levers through 90° of rotation oppositely of each other between latching positions wherein the operating levers are positioned generally colinear with each other and the latch bolts to extend the latch bolts into engagement with the keepers and unlatching positions wherein the operating levers are located generally parallel to one another and normal to the latched bolts. A lock lever is pivotally mounted on the closure panel and is spring biased to a locking position wherein a hook portion of the lock lever captures the latch bolt in the latched position colinear with the operating lever. An occupant accessible push button is connected with the lock lever to pivot the lock lever against the bias of the spring and release the latch bolt to permit latch bolt retraction. The lock lever has a cam surface engageable by the latch bolt to pivot the lock lever against the spring bias upon movement of the latch bolt from the retracted position to the extended position to permit entry and capture of the lock bolt by the lock lever.

3 Claims, 3 Drawing Figures

LOCK FOR REMOVABLE ROOF CLOSURE LATCH MECHANISM

The invention relates to a latch mechanism and more particularly to a lock for a latch mechanism securing a removable roof closure panel in a vehicle body roof opening.

It is well known in automotive vehicle bodies to provide a roof opening having a removable closure panel. One such well known removable roof structure is shown in U.S. Pat. No. 2,556,062, issued to G. M. Buehrig on June 5, 1951, and includes a central spine or backbone which extends from the fixed rearward roof portion to the windshield header to stiffen the vehicle roof structure and define an opening over the driver and over the front seat passenger. The doors of the vehicle are preferably of the type having a frameless window so that the occupant enjoys openness to the side and above when the windows are rolled down. The inboard portion of each closure panel is retained in the roof opening by mating male/female connectors provided respectively on the central spine of the roof and on the removable closure panel. The outboard portion of the removable closure panel is attached to the vehicle body roof structure by a pair of sliding bolts engageable with receptacles on the rearward roof portion and on the windshield header.

U.S. patent application Ser. No. 859,289, filed Dec. 12, 1977 by Lee et al. discloses an improved latch mechanism for a removable roof closure of the Buehrig type. According to that invention, first and second keepers are mounted on the vehicle body at the opposite sides of the roof opening. First and second latch bolts are movably mounted on the closure panel and have first end portions adapted for latching engagement with the keepers upon extension away from one another and unlatching disengagement from the keepers upon retraction toward one another. First and second operating levers have their first ends pivotally mounted on the closure panel for movement about spaced axes and have second ends respectively pivotally connected with second end portions of the first and second latch bolts to extend and retract the first ends of the latch bolts upon rotation of the operating levers. Interengaging gear teeth are provided on the first and second operating levers to simultaneously rotate the second operating lever upon rotation of the first operating lever by a handle associated therewith. The operating levers rotate oppositely of each other to their respective latching positions wherein the two operating levers are positioned generally colinear with each other and with the latch bolts to effect extension of the first ends of the latch bolts and latching engagement thereof with their respective keepers. The levers are rotated through 90° of rotation from their latching positions to their respective unlatching positions wherein the operating levers are located generally parallel to one another and normal to their respective latch bolts to effect retraction of the latch bolts and unlatching disengagement of their first ends from the respective keepers.

SUMMARY OF THE INVENTION

The present invention provides a lock which is associated with the movable roof closure latch mechanism of Ser. No. 859,289 to prevent the vehicle occupant from unlatching the roof closure prior to unlocking the latch mechanism.

According to the invention, a lock lever is pivotally mounted on the closure panel generally adjacent the second end portion of one of the latch bolts for pivotal movement about an axis transverse to the pivot axis of the operating levers. The lock lever has a hook portion adapted to capture the latch bolt in the latched position colinear with the associated operating lever to thereby prevent rotation of the operating levers to retract either of the latch bolts from the keeper engaged thereby. The lock lever is spring biased toward the position capturing the latch bolt. An occupant accessible push button is operably connected with the lock lever to pivot the lock lever against the bias of the spring and release the first latch bolt from capture by the lock lever so that the latch bolts may be retracted. The lock lever has a cam surface engageable by the latch bolt to pivot the lock lever against the spring bias upon movement of the latch bolt from the retracted position to the extended position to permit entry and capture of the latch bolt by the lock lever.

Accordingly, the object, feature and advantage of the invention resides in the provision of a lock lever spring biased to engage a latch bolt of a removable roof closure to prevent movement of the latch bolt to an unlatched condition until the occupant disengages the lock lever from the latch bolt.

Another object, feature and advantage of the invention resides in the provision of a lock lever having a hook lever adapted to capture a latch bolt of a removable roof closure in the latched position and a cam surface engageable by the latch bolt upon movement of the latch bolt from the unlatched position to the latched position to automatically pivot the lock lever to permit entry and capture of the latch bolt by the lock lever hook portion independently of any occupant effort to engage the lock.

These and other objects, features and advantages of the invention become apparent upon consideration of the appended specification and the drawings in which.

Figure 1:
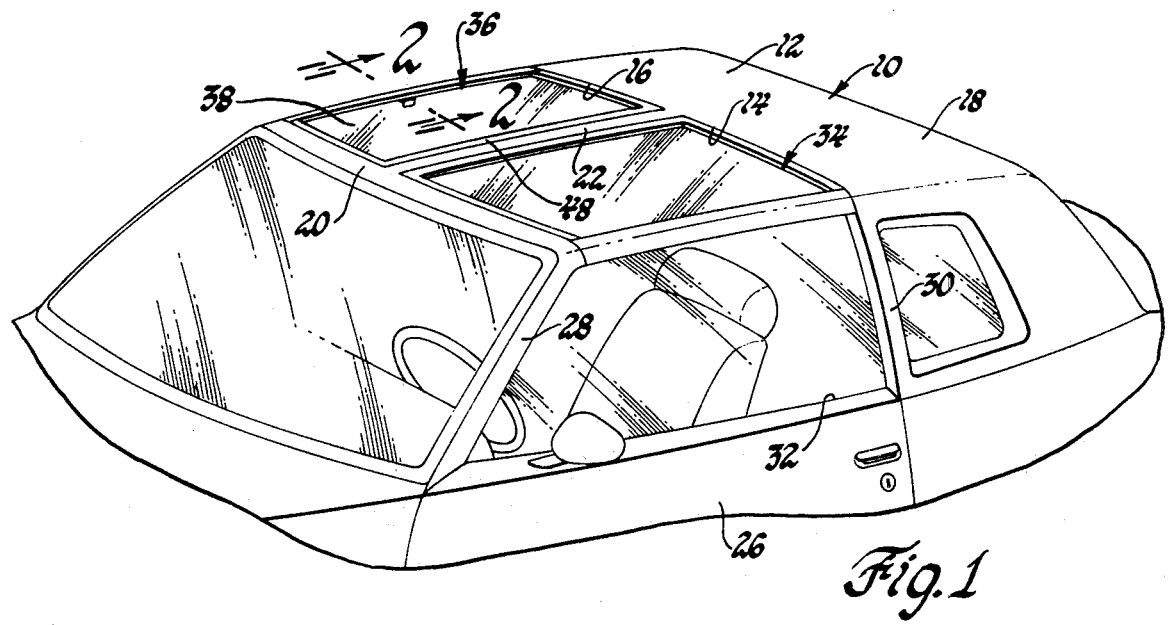
FIG. 1 is a partial perspective view of a vehicle body having a removable roof closure panel.

Referring to FIG. 1, it is seen that a vehicle body 10 includes a roof structure 12 having a roof opening 14 located generally above the driver's seat and a roof opening 16 located generally above the passenger's seat. The roof opening 14 is defined by a fixed rearward roof portion 18, a windshield header 20 and a central spine 22 which extends between the fixed rearward roof portion 18 and the windshield header 20. The driver's door 26 cooperates with the windshield pillar 28 and rear pillar 30 to define a window opening 32 which communicates with the roof opening 14 so that the driver enjoys open space to the side and above. A removable roof closure panel 34 is provided to close the roof opening 14. A like closure panel 36 is provided to close the roof opening 16.

Figure 2:
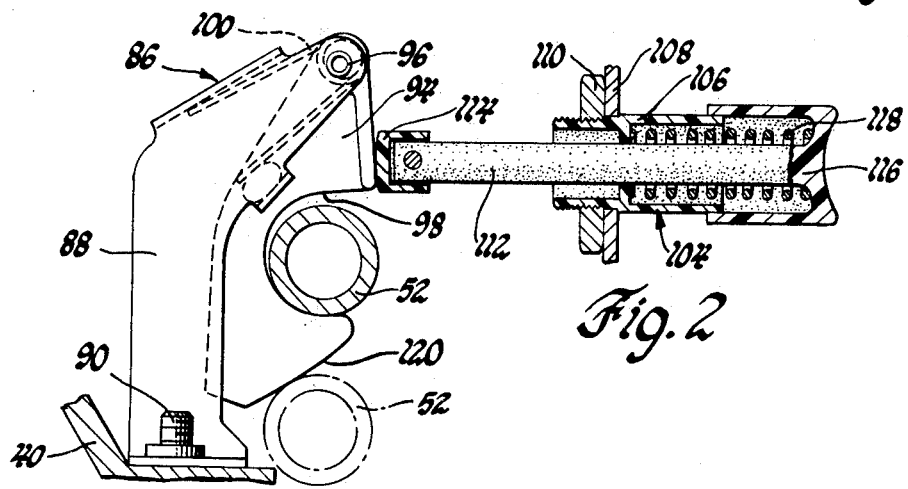
FIG. 2 is a sectional view taken in the direction of arrows 2—2 of FIG. 1 and showing the lock for locking the latch mechanism in the latched condition.
Figure 3:
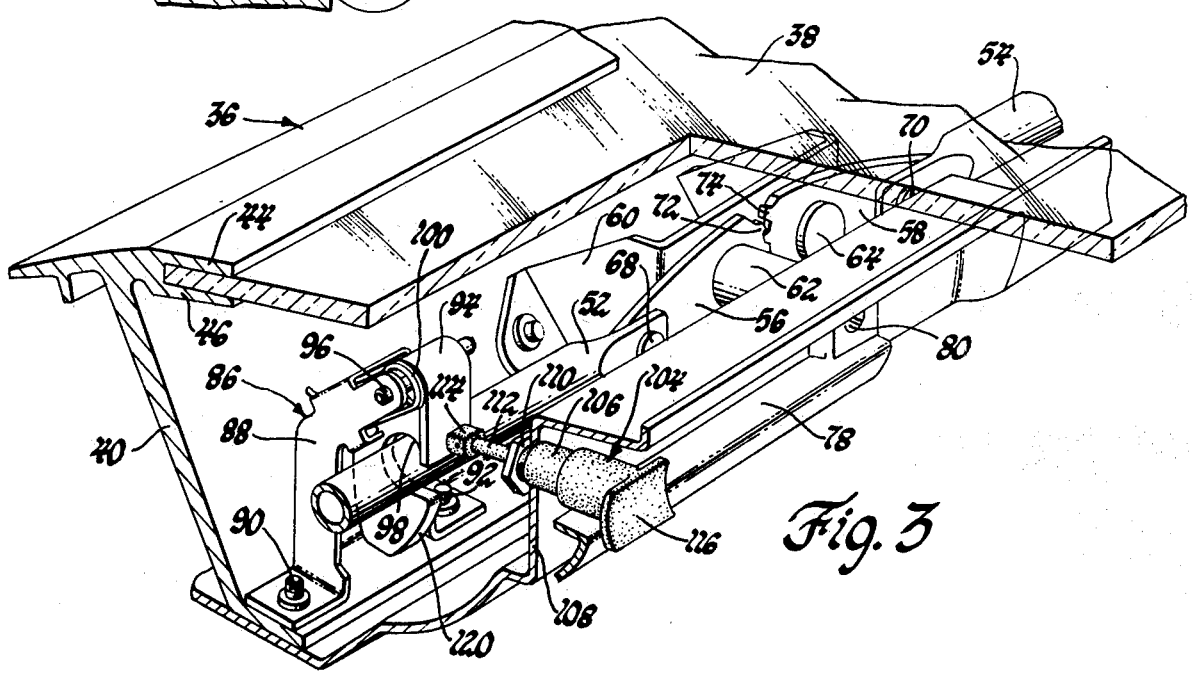
FIG. 3 is a partial perspective view of the latch mechanism and the lock mechanism for locking the latch mechanism in the latched condition.

Referring to FIGS. 2 and 3, it is seen that the closure panel 36 is generally comprised of a transparent panel 38 having a support channel 40 along its outboard edge. As best seen in FIG. 3, the support channel 40 is preferably of extruded aluminum and includes spaced apart walls 44 and 46 forming a C-shaped channel to receive the edge of the transparent panel 38. When the closure panel 36 is installed on the vehicle body to close the roof opening 16, the support channel 40 extends longitudinally of the vehicle between the fixed rearward roof portion 18 and the windshield header portion 20.

Mating male and female connectors, not shown in the drawings, are provided between the central spine 22 and a channel 48 at the inboard portion of the closure panel 36. These connectors are interengaged during transverse sliding movement of the closure panel 36 into the roof opening 16 to retain the inboard portion of the closure panel 36 on the roof structure 12.

A latch mechanism is mounted upon the support channel 40 for latching the closure panel 36 in the installed position of FIG. 1. A complete description of the latch mechanism is disclosed in U.S. patent application Ser. No. 859,289, filed Dec. 12, 1977 by Lee et al. Ser. No. 859,289 is incorporated herein by reference. For purposes of the present invention, it is sufficient to understand that a keeper, not shown, is attached to the windshield header adjacent the forward end of the support channel 40 and another keeper, not shown, is attached to the fixed roof portion 18 adjacent the rearward end of the support channel 40. The latch mechanism includes a forward latch bolt 52 and a rearward latch bolt 54 which are movable between extended latched positions respectively engaged within apertures of the forward and rearward keepers and retracted unlatched positions disengaged from the keepers to permit removal of the closure panel 36.

Referring to FIG. 3, it is seen that a pair of operating levers 56 and 58 are respectively attached to a support bracket 60 by pivot shafts 62 and 64. The latch bolt 52 is a tube and has a flattened end which is attached to the operating lever 56 by a pivot pin 68. The flattened end of latch bolt 54 is likewise attached to the operating lever 58 by a pivot pin 70. As seen in FIG. 3, the operating levers 56 and 58 are respectively provided with intermeshing gear teeth 72 and 74 which are arcuate about their respective pivot shafts 62 and 64. A handle 78 is attached to the pivot shaft 62 by a screw 80 so that counterclockwise pivotal movement of the handle 78 from the position of FIG. 3 rotates the operating lever 56 in the counterclockwise direction to move the pivot pin 68 through a 90° arc so that the latch bolt 52 is bodily shifted to the phantom line indicated position of FIG. 2 and retracted from engagement with the forward keeper on the windshield header 20. The intermeshing gear teeth 72 and 74 acting between the operating levers 56 and 58 cause the operating lever 58 to be simultaneously rotated in the clockwise direction of rotation about its pivotal shaft 64 to retract the latch bolt 54 from engagement with the rearward keeper mounted on the fixed roof portion 18. The operating levers 56 and 58 are provided with abutment faces, not shown, which become engaged with one another to limit the unlatching rotation of the operating levers to a position wherein the levers are located generally parallel to one another and normal to their respectively associated latch bolts. Upon such retraction and withdrawal of the latch bolts 52 and 54 from latching engagement with their associated keepers, the closure panel 36 may be lifted first vertically and then transversely of the vehicle body to disengage the mating male and female connectors provided between the central spine 22 to the vehicle body and the channel 48 at the inboard portion of the closure panel 36.

Referring to FIGS. 2 and 3, a lock mechanism, generally indicated at 86, is provided for locking the latch mechanism in the latched position. A mounting bracket 88 has a pair of spaced legs respectively attached to the support channel 40 by a pair of nut and bolt assemblies 90 and 92. A lock lever 94 is pivotally mounted on the support bracket 88 by a pivot shaft 96. The lock lever 94 has a recess 98 which is adapted to capture the latch bolt 52. A spring 100 surrounds the pivot shaft 96 and acts between the mounting bracket 88 and the lock lever 94 to urge the lock lever 94 to the latch bolt engaging position of FIGS. 2 and 3. When the latch bolt 52 is engaged within the recess 98 of the lock lever 94, the handle 78 cannot pivot the operating lever 56 to retract the latch bolt 52 because the latch bolt 52 is not permitted to shift bodily in the downward direction to the phantom line indicated position of FIG. 2.

Referring to FIG. 2, a push button mechanism, generally indicated at 104, is provided for pivoting the lock lever 94 away from engagement with the latch bolt 52. The push button mechanism 104 includes a housing 106 which extends through an aperture in a trim panel 108 of the closure panel 36. A nut 110 attaches the housing 106 on the trim panel 108. A push rod 112 extends through the housing 106 for reciprocal motion therein and carries an actuator button 114 which is engageable with the lock lever 94. The other end of the push rod 112 includes an integral push button 116 which is conveniently accessible within the occupant compartment. A coil compression spring 118 acts between the housing 106 and the push button 116 to establish a normal location of the push rod 112 within the housing 106 as shown in FIG. 2.

When the vehicle occupant depresses the push button 116, the push rod 112 and its actuator button 114 forcibly pivot the lock lever 94 against the bias of spring 100 to move the recess 98 out of capturing engagement with the latch bolt 52. Accordingly, the occupant may rotate the handle 78 in the counterclockwise direction to retract the latch bolts 52 and 54 from their respective keepers. The location of the push button 116 adjacent the handle 78 permits the occupant to conveniently effect the unlocking and unlatching actions with one hand. When handle rotation establishes the latch bolt 52 in the phantom line indicated unlatched position of FIG. 2, the push button 116 may be released by the occupant so that the spring 100 returns the lock lever 94 to its position of FIG. 2.

When the closure panel 36 is reinstalled on a vehicle body and the handle 78 returned to its FIG. 3 position, the upward movement of the latch bolt 52 from the phantom line indicated position in FIG. 2 to the solid line indicated position will engage upon a lower cam surface 120 of the lock lever 94 to bias the lock lever 94 to its disengaged position. When the latch bolt 52 assumes its fully latched position, the spring 100 returns the lock lever 94 to its locked position of FIG. 2 to automatically capture the latch bolt 52 within the lock lever recess 98. The abutting engagement between the push rod 112 and the lock lever 94 provides a lost motion connection which permits movement of the lock lever 94 independently of movement of the push rod 112.

Thus, it is seen that the invention provides a lock lever which is spring biased to engage a latch bolt of a removable roof closure to prevent movement of the latch bolt to an unlatched condition until the occupant disengages the lock lever from the latch bolt.

The embodiments of the invention in which an exclusive property or privilege is claimed are defined as follows:

1. A latch mechanism for securing a removable roof closure panel in an opening in a vehicle body roof panel comprising:

first and second keepers mounted on the vehicle body at opposite sides of the roof opening;

first and second latch bolts movably mounted on the closure panel and having first end portions adapted for respective latching engagement with the keepers upon extension away from one another and unlatching disengagement from the keepers upon retraction toward one another;

first and second operating levers having first ends pivotally mounted on the closure panel for movement about spaced axes and having second ends respectively pivotally connected with second end portions of the first and second latch bolts to extend and retract the latch bolts upon rotation of the operating levers;

means for rotating one of the levers;

intermeshing gear teeth provided on the first and second operating levers to simultaneously rotate the second lever with the first lever, the levers rotating oppositely of each other between a latching position wherein the levers are located generally colinear with each other and with the latch bolts to extend the latch bolts, and an unlatching position wherein the levers are located generally parallel to one another and normal to their respective latch bolts to retract the latch bolts;

a lock lever pivotally mounted on the closure panel generally adjacent the second end portion of one of the latch bolts for pivotal movement about an axis transverse to the axes of the operating levers and having a hook portion adapted to capture the one latch bolt in the position colinear with the associated operating lever and thereby prevent rotation of the operating levers to retract either of the latch bolts;

and occupant actuatable release means for pivoting the lock lever to release the one latch bolt whereby both operating levers may be rotated to retract both latch bolts.

2. A latch mechanism for securing a removable roof closure panel in a vehicle body roof opening comprising:

first and second keepers mounted on the vehicle body at opposite sides of the roof opening;

first and second latch bolts movably mounted on the closure panel and having first end portions adpated for respective latching engagement with the keepers upon extension away from one another and unlatching disengagement from the keepers upon retraction toward one another;

first and second operating levers having first ends pivotally mounted on the closure panel for movement about spaced axes and having second ends respectively pivotally connected with second end portions of the first and second latch bolts to extend and retract the latch bolts upon rotation of the operating levers;

means for rotating one of the levers;

intermeshing gear teeth provided on the first and second operating levers to simultaneously rotate the second lever with the first lever, the levers rotating oppositely of each other between a latching position wherein the levers are located generally colinear with each other and with the latch bolts to extend the latch bolts, and an unlatching position wherein the levers are located generally parallel to one another and normal to their respective latch bolts to retract the latch bolts;

a lock lever pivotally mounted on the closure panel generally adjacent the second end of the first latch bolt for pivotal movement about an axis transverse to the axes of the operating levers and having a hook portion adapted to capture the first latch bolt in the extended position colinear with the first operating lever to thereby prevent rotation of the first operating lever to retract the latch bolts;

spring means biasing the lock lever to the position capturing the latch bolt;

an occupant actuatable push button means having a lost motion connection with the lock lever to pivot the lock lever against the bias of the spring means and release the first latch bolt from capture by the lock lever upon actuation thereof and permit pivotal movement of the lock lever independently of movement of the occupant actuatable push means;

and said lock lever having a cam surface engageable by the first latch bolt upon movement to the extended position generally colinear with the operating lever to permit entry and capture of the latch bolt by the lock lever.

3. A latch mechanism for securing a removable roof closure panel in a vehicle body roof opening comprising:

first and second keepers mounted on the vehicle body at opposite sides of the roof opening;

first and second latch bolts movably mounted on the closure panel and having first end portions adapted for respective latching engagement with the keepers upon extension away from one another and unlatching disengagement from the keepers upon retraction toward one another;

first and second operating levers having first ends pivotally mounted on the closure panel for movement about spaced axes and having second ends respectively pivotally connected with second end portions of the first and second latch bolts to extend and retract the latch bolts upon rotation of the operating levers;

a handle attached to one of the levers to permit the occupant to rotate one of the operating levers;

intermeshing gear teeth provided on the first and second operating levers to simultaneously rotate the second lever with the first lever, the levers rotating oppositely of each other between a latching position wherein the levers are located generally colinear with each other and with the latch bolts to extend the latch bolts, and an unlatching position wherein the levers are located generally parallel to one another and normal to their respective latch bolts to retract the latch bolts;

a lock lever pivotally mounted on the closure panel generally adjacent the second end of the first latch bolt for pivotal movement about an axis transverse to the axes of the operating levers and having a hook portion adapted to capture the first latch bolt in the extended position colinear with the first operating lever to thereby prevent rotation of the first operating lever to retract the latch bolts;

spring means biasing the lock lever to the position capturing the latch bolt;

and occupant actuatable push button means mounted on the closure panel for pivoting the lock lever against the bias of the spring means to release the first latch bolt from capture by the lock lever, said push button means being located adjacent the handle to permit the occupant to use one hand to actuate the push button means to unlock the lock lever and rotate the handle to unlatch the latch bolts.

* * * * *